United States Patent
Mofidi et al.

(10) Patent No.: US 10,361,745 B2
(45) Date of Patent: Jul. 23, 2019

(54) SYSTEMS AND METHODS FOR REDUCING TRANSMIT AND RECEIVE POWER VIA A T/R SWITCH

(71) Applicant: QUALCOMM Incorporated, San Diego, CA (US)

(72) Inventors: Mahbod Mofidi, San Diego, CA (US); Salvatore Pennisi, Irvine, CA (US); Xiao Deng, San Diego, CA (US); Pravin Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/791,699

(22) Filed: Oct. 24, 2017

(65) Prior Publication Data

US 2019/0007086 A1 Jan. 3, 2019

Related U.S. Application Data

(60) Provisional application No. 62/526,106, filed on Jun. 28, 2017.

(51) Int. Cl.
*H04B 1/44* (2006.01)
*H04B 1/48* (2006.01)
*H04B 1/525* (2015.01)

(52) U.S. Cl.
CPC ............ *H04B 1/44* (2013.01); *H04B 1/48* (2013.01); *H04B 1/525* (2013.01)

(58) Field of Classification Search
CPC .......... H04B 1/40; H04B 1/44; H04B 1/0057; H04B 1/006; H04B 7/0608; H04B 7/0617; H04W 72/0453; H04W 52/0209; Y02D 70/00
See application file for complete search history.

(56) References Cited

U.S. PATENT DOCUMENTS

| | | | |
|---|---|---|---|
| 9,065,541 B2 | 6/2015 | Rofougaran et al. | |
| 10,097,232 B2 * | 10/2018 | Bacon | H04B 1/48 |
| 2004/0259505 A1 | 12/2004 | Vasanth | |

(Continued)

FOREIGN PATENT DOCUMENTS

| | | |
|---|---|---|
| CN | 104980383 A | 10/2015 |
| GB | 2309342 A | 7/1997 |
| JP | H1093503 A | 4/1998 |

OTHER PUBLICATIONS

Partial International Search Report—PCT/US2018/034763—ISA/EPO—dated Aug. 22, 2018.

(Continued)

*Primary Examiner* — Thanh C Le
(74) *Attorney, Agent, or Firm* — Austin Rapp

(57) ABSTRACT

A wireless communication device is described. The wireless communication device includes a transmit/receive (T/R) switch that is configured with an antenna port coupled to an antenna, a transmitter port coupled to a transmitter and a receiver port coupled to a receiver. The T/R switch selectively connects the transmitter port to the antenna port or the receiver port to the antenna port. The wireless communication device also includes a T/R switch controller that sets the T/R switch to disconnect the transmitter from the antenna when the transmitter is actively transmitting in a high insertion loss mode to reduce power from the transmitter to the antenna.

26 Claims, 8 Drawing Sheets

(56) References Cited

U.S. PATENT DOCUMENTS

| | | | |
|---|---|---|---|
| 2013/0003617 A1* | 1/2013 | Gudem | H04B 1/525 370/277 |
| 2013/0169333 A1* | 7/2013 | Oshima | H03H 11/16 327/237 |
| 2013/0229954 A1 | 9/2013 | Narathong et al. | |
| 2014/0120968 A1 | 5/2014 | Mahmood et al. | |
| 2015/0094003 A1 | 4/2015 | Ramkumar et al. | |
| 2015/0293189 A1 | 10/2015 | Lips | |
| 2015/0326326 A1 | 11/2015 | Nobbe et al. | |
| 2016/0242113 A1 | 8/2016 | McIntyre | |
| 2017/0063404 A1* | 3/2017 | Langer | H04W 72/0453 |

OTHER PUBLICATIONS

International Search Report and Written Opinion—PCT/US2018/034763—ISA/EPO—dated Dec. 14, 2018.

\* cited by examiner

SYSTEMS AND METHODS FOR REDUCING TRANSMIT AND RECEIVE POWER VIA A T/R SWITCH

RELATED APPLICATIONS

This application is related to and claims priority from U.S. Provisional Patent Application Ser. No. 62/526,106, filed Jun. 28, 2017, for "SYSTEMS AND METHODS FOR REDUCING TRANSMIT AND RECEIVE POWER VIA A T/R SWITCH."

TECHNICAL FIELD

The described technology generally relates to an apparatus and method of wireless communication. More particularly, the technology relates to systems and methods for reducing transmit and receive power via a transmit/receive (T/R) switch.

BACKGROUND

In the last several decades, the use of wireless communication devices has become common. In particular, advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices. More specifically, wireless communication devices that perform new functions and/or that perform functions faster, more efficiently or more reliably are often sought after.

Advances in technology have resulted in smaller and more powerful wireless communication devices. For example, there currently exists a variety of wireless communication devices such as portable wireless telephones (e.g., smartphones), personal digital assistants, laptop computers, tablet computers and paging devices that are each small, lightweight and can be easily carried by users.

In many scenarios, it is beneficial to reduce the power sent by a transmitter or received at a receiver. For example, in security-critical communications, it may be desirable to reduce the transmit power. Additionally, as a transmitter ramps up or ramps down, unwanted signals may be generated. Benefits may be realized by reducing transmit and receive power via a transmit/receive (T/R) switch.

SUMMARY

A wireless communication device is described. The wireless communication device includes a transmit/receive (T/R) switch that is configured with an antenna port coupled to an antenna, a transmitter port coupled to a transmitter and a receiver port coupled to a receiver. The T/R switch selectively connects the transmitter port to the antenna port or the receiver port to the antenna port. The wireless communication device also includes a T/R switch controller that sets the T/R switch to disconnect the transmitter from the antenna when the transmitter is actively transmitting in a high insertion loss mode to reduce power from the transmitter to the antenna.

The T/R switch may disconnect the transmitter from the antenna by connecting the antenna port to the receiver port. The T/R switch may disconnect the transmitter from the antenna by connecting the transmitter port to a second transmitter port.

The method may also include determining a transmit (TX) to receive (RX) loopback signal to measure T/R switch attenuation during the high insertion loss mode.

The T/R switch controller may be further configured to set the T/R switch to disconnect the transmitter from the antenna to reduce frequency splatter during TX ramp up or TX ramp down. The T/R switch controller may be further configured to set the T/R switch to connect the transmitter port to the antenna port after the TX ramp up or before TX ramp down.

A phase-locked loop (PLL) in the transmitter may be set to a certain frequency. The T/R switch may be set to the receiver port to avoid sending out un-wanted signals. A power amplifier of the transmitter may be activated. A frequency shift at the receiver may be detected. The frequency shift may be a function of local oscillator (LO) pulling. A voltage-controlled oscillator (VCO) may be compensated based on the frequency shift.

The T/R switch controller may be further configured to set the T/R switch to disconnect the transmitter from the antenna to reduce local oscillator (LO) leakage during TX ramp up. The T/R switch may disconnect the transmitter from the antenna during PLL tune and settling times. The T/R switch controller may be further configured to set the T/R switch to connect the transmitter port to the antenna port after the TX ramp up or before TX ramp down.

The T/R switch controller may be further configured to set the T/R switch to disconnect the receiver from the antenna port when the receiver is actively receiving in high insertion loss mode to reduce power received at the receiver from the antenna.

A method is also described. The method includes determining to operate in a high insertion loss mode to reduce power from a transmitter to an antenna. The method also includes setting a transmit/receive (T/R) switch to disconnect the transmitter from the antenna when the transmitter is actively transmitting in the high insertion loss mode. The T/R switch is configured with an antenna port coupled to the antenna, a transmitter port coupled to the transmitter and a receiver port coupled to a receiver. The T/R switch selectively connects the transmitter port to the antenna port or the receiver port to the antenna port.

A non-transitory tangible computer readable medium for concurrent transmission is also described. The computer readable medium stores computer executable code. The computer readable medium includes code for causing a wireless communication device to determine to operate in a high insertion loss mode to reduce power from a transmitter to an antenna. The computer readable medium also includes code for causing the wireless communication device to set a transmit/receive (T/R) switch to disconnect the transmitter from the antenna when the transmitter is actively transmitting in the high insertion loss mode. The T/R switch is configured with an antenna port coupled to the antenna, a transmitter port coupled to the transmitter and a receiver port coupled to a receiver. The T/R switch selectively connects the transmitter port to the antenna port or the receiver port to the antenna port.

An apparatus is also described. The apparatus includes means for determining to operate in a high insertion loss mode to reduce power from a transmitter to an antenna. The apparatus also includes means for setting a transmit/receive (T/R) switch to disconnect the transmitter from the antenna when the transmitter is actively transmitting in the high insertion loss mode. The T/R switch is configured with an antenna port coupled to the antenna, a transmitter port coupled to the transmitter and a receiver port coupled to a receiver. The T/R switch selectively connects the transmitter port to the antenna port or the receiver port to the antenna port.

DETAILED DESCRIPTION

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
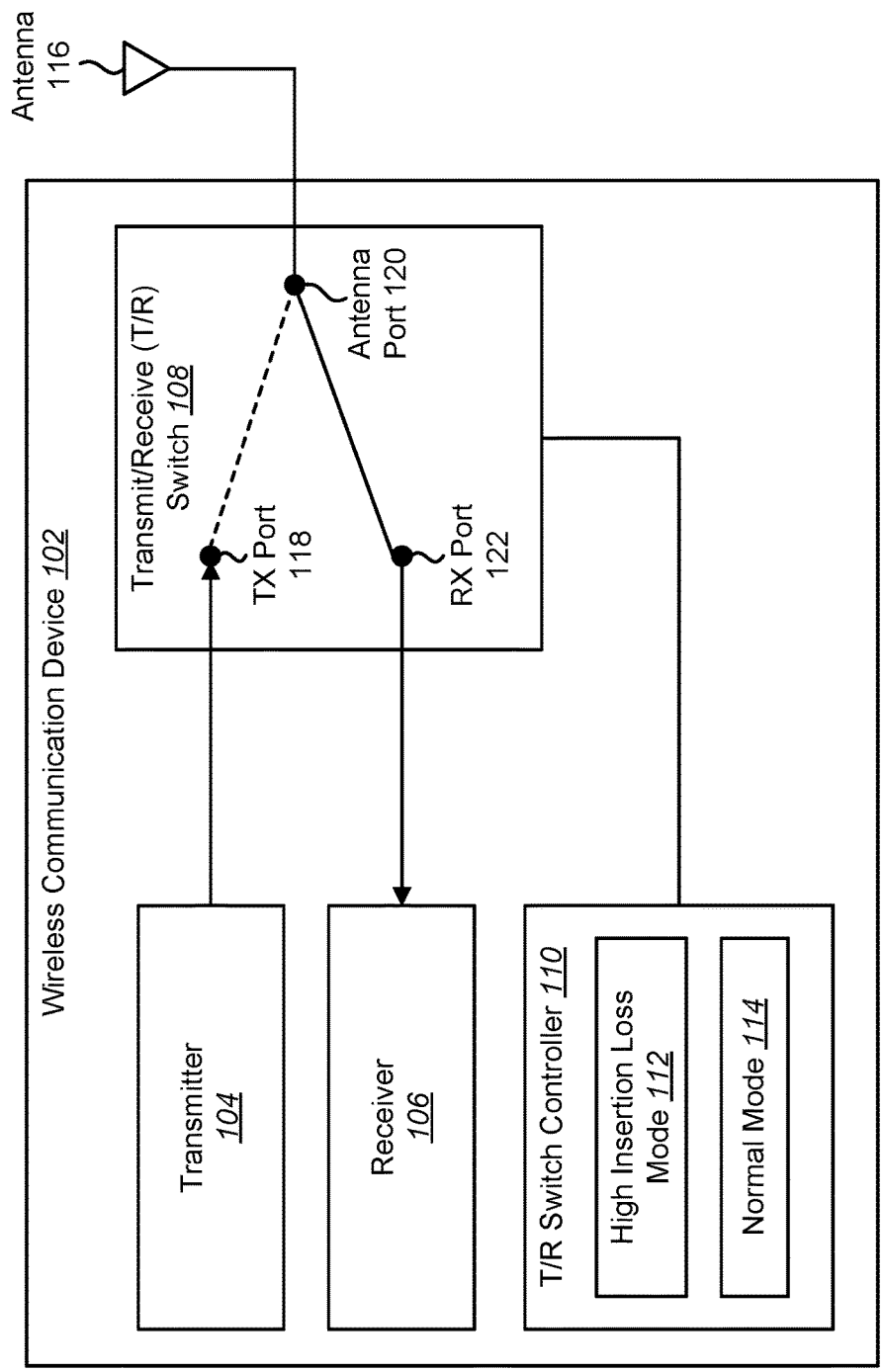
FIG. 1 is a block diagram illustrating one configuration of a wireless communication device for reducing transmit and receive power via a transmit/receive (T/R) switch.

FIG. 1 is a block diagram illustrating one configuration of a wireless communication device 102 for reducing transmit and/or receive power via a transmit/receive (T/R) switch 108. Some wireless communication devices 102 may utilize multiple communication technologies. For example, one communication technology may be utilized for mobile wireless system (MWS) (e.g., cellular) communications, while another communication technology may be utilized for wireless connectivity (WCN) communications. MWS may refer to larger wireless networks (e.g., wireless wide area networks (WWANs), cellular phone networks, Long Term Evolution (LTE) networks, Global System for Mobile Communications (GSM) networks, code division multiple access (CDMA) networks, CDMA2000 networks, wideband CDMA (W-CDMA) networks, Universal mobile Telecommunications System (UMTS) networks, Worldwide Interoperability for Microwave Access (WiMAX) networks, etc.). WCN may refer to relatively smaller wireless networks (e.g., wireless local area networks (WLANs), wireless personal area networks (WPANs), Institute of Electrical and Electronics Engineers (IEEE) 802.11 (Wi-Fi) networks, Bluetooth (BT) networks, wireless Universal Serial Bus (USB) networks, etc.).

Communications in a wireless communication system (e.g., a multiple-access system) may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) 104 and receiver(s) 106 equipped, respectively, with multiple ($N_T$) transmit antennas 116 and multiple ($N_R$) receive antennas 116 for data transmission. SISO and MISO systems are particular instances of a MIMO system. The MIMO system can provide improved performance (e.g., higher throughput, greater capacity or improved reliability) if the additional dimensionalities created by the multiple transmit and receive antennas 116 are utilized.

A wireless communication device 102 may also be referred to as a wireless device, a mobile device, mobile station, subscriber station, client, client station, user equipment (UE), remote station, access terminal, mobile terminal, terminal, user terminal, subscriber unit, etc. Examples of wireless communication devices 102 include laptop or desktop computers, cellular phones, smartphones, wireless modems, e-readers, tablet devices, gaming systems, keyboards, keypads, computer mice, remote controllers, handsets, headsets, headphones, automobile hands-free audio system, etc.

In an implementation, the wireless communication device 102 may be configured to communicate using Bluetooth protocols. A wireless communication device 102 configured to communicate using Bluetooth may be referred to as a Bluetooth device. A Bluetooth device may be configured to establish links with one or more target devices that have Bluetooth transceivers. Bluetooth is a packet-based protocol with a master-slave structure. Bluetooth operates in the Industrial, Scientific and Medical (ISM) 2.4 GHz short-range radio frequency band (e.g., 2400-2483.5 MHz). Bluetooth uses a radio technology called frequency-hopping spread spectrum in which transmitted data is divided into packets and each packet is transmitted on a designated Bluetooth frequency (e.g., channel).

Communications in a Bluetooth network may be achieved based on a master polled system. The master polled system may utilize time-division duplexing (TDD) in which a Bluetooth device sends a packet to a target device. For example, the wireless communication device 102 may operate as a master. The wireless communication device 102 may send a packet to a target remote device during pairing, during a connection request or during subsequent communication. In one implementation, the wireless communication device 102 may be a master device and a remote device may be a slave device. In a master polled system, the master device sending the packet gives the slave device the ability to transmit back.

The Bluetooth wireless communication standard is typically employed for exchanging communications between fixed or mobile Bluetooth-enabled devices over short distances. In some configurations, the systems and methods disclosed herein may be applied to Bluetooth Low Energy (BLE) devices. LE refers to the "Low Energy" extension of the Bluetooth standard. The BLE extension is focused on energy-constrained applications such as battery-operated devices, sensor applications, etc. The BLE extension may also be referred to as Bluetooth Smart.

The following description uses terminology associated with the Bluetooth and Bluetooth LE standards. Nevertheless, the concepts may be applicable to other technologies and standards that involve modulating and transmitting digital data. Accordingly, while some of the description is provided in terms of Bluetooth standards, the systems and methods disclosed herein may be implemented more generally in wireless communication devices 102 that do not conform to Bluetooth standards.

In many scenarios, it is beneficial to reduce the amount of power sent from a transmitter 104 or received at a receiver 106. For example, one problem is limiting transmit (TX) power during security-critical communications. Reducing the TX power may help protect sensitive wireless communication by limiting the distance that the signals can be detected. Lower TX output power can be used for the following use cases: (1) a reduced range for more secure financial transactions using BT; and (2) communicating with multiple BT/Zigbee devices by just brining the wireless communication device 102 closer to a remote device rather than choosing from a large list of connected devices. However, on-chip solutions may not be designed to lower TX output power to sufficiently low levels.

In an example, lower TX output power for BT may be beneficial. Depending on the application, the lower TX output power may range from −10 dBm to −55 dBm or even lower. Lower TX output power for BT may be used for payment through BT technology, proximity advertising, or other use-cases where reduced range is desired. These applications may require very accurate output power over process, voltage, temperature, and frequency (PVTF).

Therefore, there is a need for a simple and accurate method for radio frequency analog (RFA) hardware to reduce the TX output power further than the internal integrated circuit (IC) design allows. Additionally, lower power level steps may be used to meet the BT Core 2 dB min to 8 dB maximum step size for a given power level and maintain+/−2 dB accuracy. Existing solutions have limitations in achieving precise output power. Current approaches rely on backing off the TX gain or other stages.

There are at least two issues with these approaches. There may not be enough gain reduction to achieve the desired TX output power. Similar problems exist for Internet of things (IOT) devices where the minimum accurate TX output power is limited to −10 dBm. Additionally, when RFA stages are turned off, the resulting TX output power reduction may not be accurate over PVTF.

Incorporating attenuators and/or lower gain levels in the wireless communication device 102 may increase die area and may add additional risks. This may add cost and complexity to a wireless communication device 102.

Another problem is TX frequency splatter. TX frequency splatter may occur during TX ramp up and TX ramp down times violating TX in-band mask emission specifications. In this case, a sudden current rush, transients, and other magnetically coupled disturbances can pull a voltage-controlled oscillator (VCO) off frequency. This may result in the wireless communication device 102 violating wireless standards and/or regulations. For example, the TX frequency splatter may violate the Federal Communications Commission (FCC) restricted band at the 2.4 GHz ISM band edge.

With TX frequency splatter, in-band emissions failures may occur due to VCO pulling or other transitory impairments (e.g., supply transients) that cause spurious emissions during TX ramp up and ramp down.

In an example, existing BT/BLE and IEEE 802.15.4/Zigbee solutions could use an additional margin for this important TX specification. Typically this is one of the reasons where the BT TX power (e.g., for 8DPSK and pi/4DQPSK) needs to be reduced at the highest power level to meet the TX in-band mask requirements, FCC restricted band emissions requirements, and BT Core TX frequency range requirements for low and high ISM band channels. Similar specs are specified for IEEE 802.15.4/Zigbee.

Yet another problem is phase-locked loop (PLL) and/or local oscillator (LO) leakage. In some cases, PLL/LO leakage may occur during PLL tune/settling time. This PLL/LO leakage may cause interoperability issues with other devices (e.g., radio frequency (RF) testers and other wireless communication devices 102).

In some scenarios, a high level of LO feedthrough may occur before the start of a TX packet. For example, in a transmitter 104, the PLL must first be tuned to the desired channel Additional time may be allocated for frequency settling so that the transmission is on-frequency before the TX ramps up and sends modulated data. During the interval that the PLL is being tuned and settles, the VCO and/or the LO could leak out of the transmitter (TX) port 118.

This undesired leakage could potentially be observed by another device's receiver, which could cause the following issues. The other device's receiver may become saturated if its receiver (RX) automatic gain control (AGC) settles on a gain state during the LO leakage period of the transmitter 104. Typical LO leakage levels may range from −20 dBc to −50 dBc below the main TX carrier. Therefore, if the other receiver's AGC is fooled into settling at a gain state to receive this much lower perceived signal level, once the actual carrier is transmitted, the energy at the other receiver input will now be 20 dB to 50 dB higher. The receiver would be saturated, resulting in higher packet errors and data throughput reduction.

Another issue with LO feedthrough may occur during the tuning and settling of the PLL. During this period, the frequency of the PLL will be varying verses time until it is settled. This leaked PLL/LO energy with varying frequency could be mistaken as some form of phase/frequency modulation (e.g., various forms of Frequency-shift keying (FSK) and Phase-shift keying (PSK) used by BT and IEEE 802.15.4/Zigbee), which can be mistaken as the start of the packet. This phenomenon will also result in higher packet errors, throughput reduction, or even prevent interoperability with other devices.

The systems and methods described herein address these and other problems associated with transmit and receive power via a transmit/receive (T/R) switch 108 (also referred to as a TX/RX Switch). The wireless communication device 102 may be configured with a transmitter 104, a receiver 106, an antenna 116 and a T/R switch 108.

The T/R switch 108 may be configured with a plurality of ports. In an implementation, an antenna port 120 may be coupled to an antenna 116, a transmitter (TX) port 118 may be coupled to a transmitter 104 and a receiver (RX) port 122 may be coupled to a receiver 106.

The T/R switch 108 may selectively connect the transmitter port 118 to the antenna port 120 or the receiver port 122 to the antenna port 120. The T/R switch 108 may receive a signal that instructs which ports are connected. For example, a first signal (or value of a signal) may instruct the T/R switch 108 to connect the transmitter port 118 to the antenna port 120. A second signal (or second value of the signal) may instruct the T/R switch 108 to connect the receiver port 122 to the antenna port 120. In an implementation, a T/R switch controller 110 may send a signal that sets the T/R switch 108 to a desired configuration.

The T/R switch 108 may allow the transmitter 104 and receiver 106 to share a single antenna 116. For example, the wireless communication device 102 may use the T/R switch 108 to perform duplexing of the transmitter 104 and receiver 106. Therefore, rather than having an antenna for TX operations and another antenna for RX operations, a single antenna 116 may be used.

In an implementation, the T/R switch 108 may be an external component to an integrated chip (IC) that includes the transmitter 104 and receiver 106. In another implementation, the T/R switch 108 may be an internal switch that is included in the IC with the transmitter 104 and receiver 106.

In a normal mode 114 of operation (also referred to as mission mode), the T/R switch 108 may connect the transmitter 104 or receiver 106 to the antenna 116 based on which component is active. For example, in normal mode 114 for transmission, the T/R switch 108 may connect the transmitter port 118 to the antenna port 120. In this case, the receiver 106 is disconnected (e.g., isolated) from the antenna port 120 while the transmitter 104 is active.

In normal mode 114 for reception, the T/R switch 108 may connect the receiver port 122 to the antenna port 120. In this case, the transmitter 104 is disconnected (e.g., isolated) from the antenna port 120 while the receiver 106 is active.

The systems and methods may lower TX output power. In an implementation, the lower TX output power may be used during a high insertion loss mode 112. For example, the wireless communication device 102 may enter high insertion loss mode 112 for certain BT communications. The wireless communication device 102 may provide additional TX output power reduction via the T/R switch 108.

As used herein, high insertion loss mode 112 is a mode of operation of the wireless communication device 102 when a high insertion loss is desired between the transmitter 104 and the antenna 116 or the receiver 106 and the antenna 116. Insertion loss refers to signal power loss between two circuit components. For example, during high insertion loss mode 112 an open circuit between the transmitter 104 and the antenna 116 may be introduced to reduce TX output power.

To accurately reduce the TX output power, the wireless communication device 102 may use T/R switch isolation as an additional attenuation in the TX path when the T/R switch 108 at the front end (FE) of the radio is thrown to the RX side rather than the TX side. This creates an additional coarse lower power step without introducing additional circuitry to the wireless communication device 102 (e.g., current BT products may already use a T/R switch 108 either externally or internally to share a single antenna 116 for TX and RX operations). For products with an external T/R switch 108, typical off-the-shelf external T/R switch isolation between the TX port 118 to the antenna port 120 can range from about 15 to 30 dB when the T/R switch 108 is thrown to the RX port 122 (or other loaded port of the T/R switch 108).

To meet TX output power accuracy (e.g., +/−2 dB), the following steps can be taken. In a first step, a TX to RX loopback signal may be used to measure the T/R switch attenuation at chip power up. In an implementation, a test signal from the modulator (e.g., a sinusoidal tone) can be transmitted through the TX chain to the TX port 118 of the T/R switch 108 while the T/R switch 108 is thrown to the RX port 122. The test signal encounters an isolation impedance ($Z_{Isolation}$) from the TX port 118 to the RX port 122 of the T/R switch 108. The test signal then passes through the RX chain at which point the test signal is recovered after down conversion by a down mixer. An example of this approach is described in connection with FIG. 3.

The demodulator block may estimate the test signal level by utilizing the received signal strength indicator (RSSI). The difference between the signal level transmitted by the modulator and received by the demodulator will be the total loss of the FE circuits.

$Z_{Isolation}$ can be derived by subtracting this total loss from the known losses in the FE that are in the test signal path. The only other losses include the actual switch loss (e.g., antenna port 120 to RX port 122 of the T/R switch 108), any minimal transmission line losses since the T/R switch 108 is placed close to the IC, and any mismatch losses in both the TX and RX paths.

This calibration routine has an added benefit that would account for these losses. Therefore, the TX power can be finely adjusted accordingly to deliver even more accurate equivalent isotropically radiated power (EIRP).

In an implementation, since in most cases there is only one synthesizer that is either used for TX or RX at a given time in normal BT time division duplexed (TDD) operation, both a TX LO and a RX LO can be enabled so that the test tone can be up converted and then down converted and recovered by the demodulator. In other implementations, two separate PLLs may be used, in which case one can be used for TX and the other by RX. In this case the frequency planning differences between RX and TX do not matter.

After the completion of this calibration routine of the RFA circuitry which occurs at power up, the resulting $Z_{Isolation}$ calculation can be accomplished by firmware/software that then writes the result to a memory location. It should be noted that the $Z_{Isolation}$ between the TX port 118 and the antenna port 120 may also be directly measured. For example, $Z_{Isolation}$ can measured with the transceiver (transmitter/receiver) IC removed from the circuit, while a signal generator generates a test signal at the TX port 118 and a power meter at the RX port 122 of the T/R switch 108 measures the power level. However, the automatic calibration technique described herein may be used each time the chip (e.g., BT chip) powers up.

In a second step, based on this measured $Z_{Isolation}$ plus additional FE losses, accurate output TX power levels not supported by on-chip solution can be achieved with sufficient accuracy over PVTF. For example, the gain of other TX chain blocks can be adjusted to create additional power levels that are lower than the existing lowest power level to maintain the BT core step size of 2-8 dB. In an implementation, for both up and down margin, the TX power level step size may be set from one step to the next at about 4-5 dB. The TX chain has both coarse and fine power adjustments. Fine adjustment can be used to calibrate the output power over PVTF.

In an example, if at the lowest existing power level (PL0) of the on-chip solution the EIRP is at −35 dBm, and $Z_{Isolation}$ plus additional FE losses is measured to be −16 dB, additional power levels may be created based on the following equation:

$$PL\text{-}X = PL0 - \text{Total } FE \text{ Loss} + TX \text{ Coarse Adjust} + TX \text{ Fine Adjust} \quad (1)$$

Three additional lower power levels of PL-1, PL-2, and PL-3 can be created to achieve −50 dBm EIRP as follows. For PL-1, the coarse adjustment is +10 dBm. For PL-2, the coarse adjustment is +5 dBm. For PL-3, the coarse adjustment is +0 dBm. For each power level, the fine adjustment is +1. Therefore, $$PL\text{-}1 = -35 - 16 + 10 + 1 = -40 \text{ dBm,}$$

$$PL\text{-}2 = -35 - 16 + 5 + 1 = -45 \text{ dBm,}$$

$$PL\text{-}3 = -35 - 16 + 0 + 1 = -50 \text{ dBm.}$$

A dummy load may be used to create a similar impedance during normal mode 114 and high insertion loss mode 112. The dummy load is described in connection with FIGS. 5 and 6.

In another aspect of the described systems and methods, the T/R switch 108 may be used to reduce frequency splatter during TX ramp up and ramp down. As described above, when the pre driver/amplifier (PDA) and the driver/amplifier (DA) ramp up or down, the sudden current rush, transients, and other magnetically coupled disturbances can pull the VCO off frequency. These undesired VCO intermittent frequency shifts are referred to as frequency splatter. The frequency splatter is a major concern in devices where the BT Core specification for in-band spectral mask is very stringent. Failures are very common and engineering teams may spend significant time and resources to mitigate this phenomenon.

To mitigate frequency splatter, a programmable timer may be implemented by the T/R switch controller 110. This timer may be referred to as a FE control timer. The FE control timer may be contained within a radio control unit (RCU) to precisely introduce the T/R switch isolation ($Z_{Isolation}$) only during the ramp up and ramp down states, which are the times during which the frequency splatter occurs. In other words, the T/R switch controller 110 may be configured to set the T/R switch 108 to disconnect the transmitter 104 from the antenna port 120 to reduce frequency splatter during TX ramp up or TX ramp down. The $Z_{Isolation}$ will reduce these undesired emissions by a significant amount. This approach is described in connection with FIG. 6.

After the TX ramp up or TX ramp down, the $Z_{Isolation}$ may be removed by switching the T/R switch 108 to the TX port 118 to not impact TX output power. In other words, the T/R switch controller 110 may be configured to set the T/R switch 108 to connect the transmitter port 118 to the antenna port 120 after the TX ramp up or TX ramp down. The systems and methods described herein reduce the frequency splatter resulting in lower in-band mask emissions.

LO pulling calibration may be performed using the TX isolation described herein. In some cases, it would be beneficial to turn on the power amplifier (PA) even before transmission, to allow for more accurate calibrations. One example is for LO pulling calibration. LO pulling is caused by an un-wanted feedback from TX output to the VCO. The effect of LO pulling is to cause a frequency shift, which can also be a change in the gain of the VCO (KVCO).

The effects of the LO pulling can be captured by enabling the PA and making it work in the same conditions as in normal mode 114 (e.g., same output power, S22, same voltage, etc.). Both phase and amplitude of the un-wanted feedback vector are highly dependent upon the TX configuration. A PA working with a different S22 and disconnected from bonding wires or external components will not lead to the same LO pulling effects.

In an implementation, LO pulling may be calibrated as follows. The PLL may be set to a certain frequency. The PA may be activated and the T/R switch 108 placed in the RX position to avoid sending out un-wanted signals. Then, the receiver 106 may detect the frequency shift which is a function of LO Pulling. At that point, the KVCO shift can be compensated as the frequency shift is properly estimated.

In another aspect, LO leakage may be reduced during TX ramp up. As described above, the $Z_{Isolation}$ of the T/R switch 108 may be used via programmable timers during the PLL tune and settling times to reduce the LO leakage seen by remote devices. The LO leakage may cause havoc to interoperability due to misdetection of the start of the packet due to frequency settling of the PLL, or saturation of the remote RX devices due to a sudden rise in TX power after the PLL tune/settling has ended.

The T/R switch controller 110 may be configured to set the T/R switch 108 to isolate the transmitter 104 from the antenna port 120 to reduce local oscillator (LO) leakage during TX ramp up. In an implementation, the FE control timer will control the logic of the T/R switch 108 to set it towards another port other than the desired TX port 118 in order to introduce the $Z_{Isolation}$ during the PLL tune/settling time.

A remote receiver or a BT tester (which has much better performance relative to a typical receiver) may have no more than 40 dB of RX dynamic range within a single gain state. The LO leakage may be reduced to a level lower than the detection capability of a remote receiver or BT tester (i.e., lower than their RX sensitivity).

In an example, the LO leakage level of the wireless communication device 102 may be −30 dBc and the T/R switch isolation ($Z_{Isolation}$) may be 20 dB. Therefore, by setting the T/R switch 108 to disconnect the transmitter 104 from the antenna 116, the wireless communication device 102 may have a new LO leakage level of −50 dBc. Any perturbations in the carrier frequency will not be mistaken by the tester or remote receiver since it is below the receiver sensitivity for one gain state to receive the higher output power that follows.

In addition to reducing TX output power, the T/R switch 108 may be used to reduce the RX input power received at the receiver 106. For example, the T/R switch controller 110 may be configured to set the T/R switch 108 to isolate the receiver 106 from the antenna port 120 when the receiver 106 is actively receiving in a high insertion loss mode 112 to reduce power received at the receiver 106 from the antenna 116. For example, the T/R switch 108 may connect the antenna port 120 to the transmitter port 118 when the receiver 106 is active. This may be beneficial to protect the receiver 106 from sudden power spikes that could saturate or damage the receiver 106. By isolating the receiver 106 with the T/R switch 108 set to the transmitter 104, the maximum RX input power may be increased.

The described systems and methods may be implemented in a firmware patch. For example, the wireless communication device 102 may include the hardware blocks to easily implement the T/R switch isolation. Therefore, the T/R switch controller 110 and the strategic isolation states may be implemented through a software update. Because aspects of the systems and methods described herein can be implemented in software, the wireless communication device 102 may be updated with a software patch instead of a costly chip revision.

Figure 2:
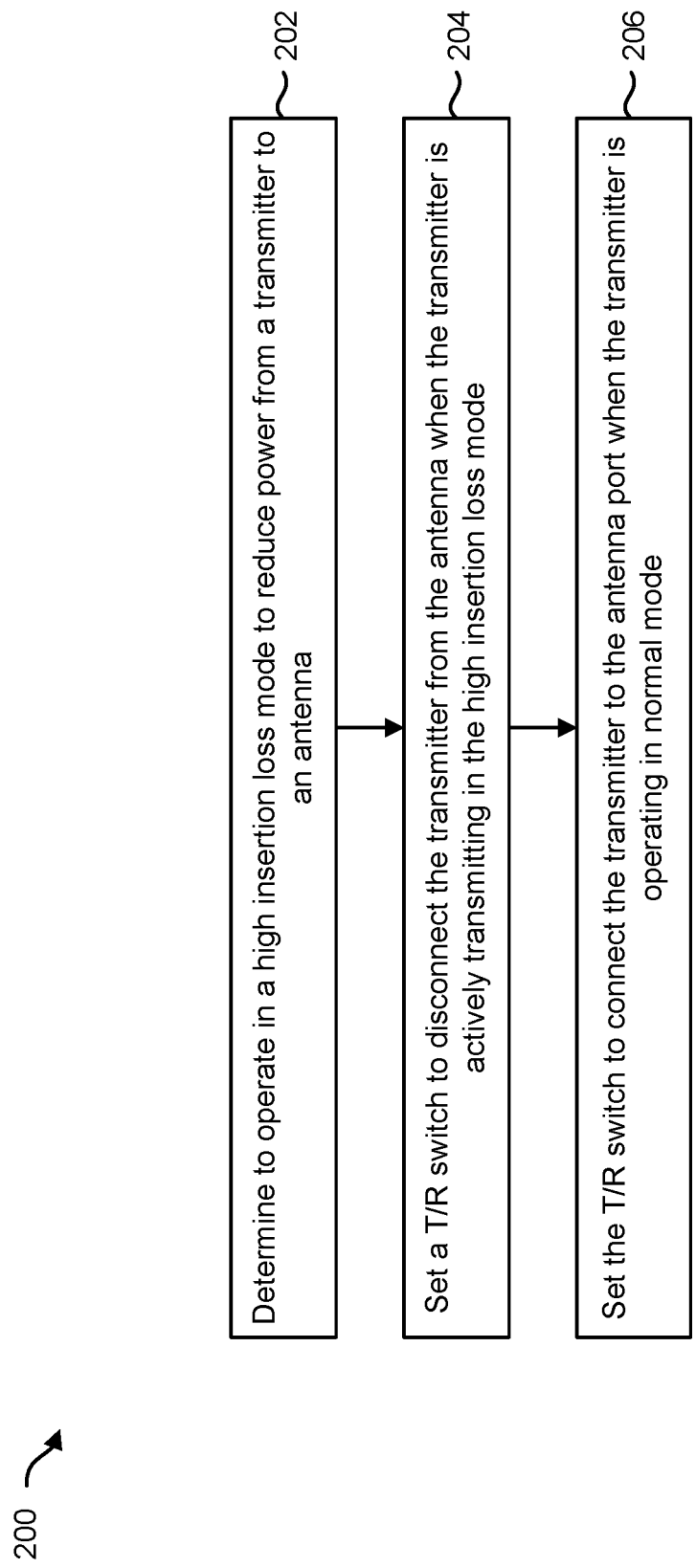
FIG. 2 is a flow diagram illustrating a method for reducing transmit power via a T/R switch.

FIG. 2 is a flow diagram illustrating a method 200 for reducing transmit power via a transmit/receive (T/R) switch 108. The method 200 may be performed by a wireless communication device 102. In one configuration, the wireless communication device 102 may be configured with a transmitter 104, a receiver 106 and a T/R switch 108. The T/R switch 108 may be configured with an antenna port 120 coupled to an antenna 116, a transmitter port 118 coupled to the transmitter 104 and a receiver port 122 coupled to the receiver 106. The T/R switch 108 may selectively connect the transmitter port 118 to the antenna port 120 or the receiver port 122 to the antenna port 120.

The wireless communication device 102 may determine 202 to operate in a high insertion loss mode 112 to reduce power from the transmitter 104 to the antenna 116. For example, the wireless communication device 102 may determine 202 to operate in a high insertion loss mode 112 during security-critical communications when low TX power output is desired. Additionally, the wireless communication device 102 may determine 202 to operate in a high insertion loss mode 112 to limit detectability of the wireless communication device 102 in a wireless network. In another implementation, the wireless communication device 102 may determine 202 to operate in a high insertion loss mode 112 to reduce frequency splatter during TX ramp up and/or ramp down. In yet another implementation, the wireless communication device 102 may determine 202 to operate in a high insertion loss mode 112 to reduce local oscillator (LO) leakage during TX ramp up.

The wireless communication device 102 may set 204 the T/R switch 108 to disconnect the transmitter 104 from the antenna 116 when the transmitter 104 is actively transmitting in the high insertion loss mode 112. For example, the T/R switch 108 may disconnect the transmitter 104 from the antenna 116 by connecting the antenna port 120 to the receiver port 122. Alternatively, the T/R switch 108 may disconnect the transmitter 104 from the antenna 116 by connecting the transmitter port 118 to a second transmitter port 118. In yet another implementation, the T/R switch 108 may disconnect the transmitter 104 from the antenna 116 by connecting the transmitter port 118 to a port other than the antenna port 120 and the receiver port 122.

In an aspect, the wireless communication device 102 may determine a transmit (TX) to receiver (RX) loopback signal to measure T/R switch attenuation during the high insertion loss mode 112.

The wireless communication device 102 may set 204 the T/R switch 108 to disconnect the transmitter 104 from the antenna 116 to reduce frequency splatter during TX ramp up or TX ramp down. The wireless communication device 102 may also set 204 the T/R switch 108 to disconnect the transmitter 104 from the antenna 116 to reduce local oscillator (LO) leakage during TX ramp up. For example, the T/R switch 108 may isolate the transmitter 104 from the antenna port 120 during PLL tune and settling times.

The wireless communication device 102 may set 206 the T/R switch 108 to connect the transmitter 104 to the antenna port 120 when the transmitter 104 is actively transmitting in normal mode 114. The wireless communication device 102 may set 206 the T/R switch 108 to connect the transmitter port 118 to the antenna port 120 when reduced transmit power is no longer needed. The wireless communication device 102 may also set 206 the T/R switch 108 to connect the transmitter port 118 to the antenna port 120 after the TX ramp up or before TX ramp down.

Figure 3:
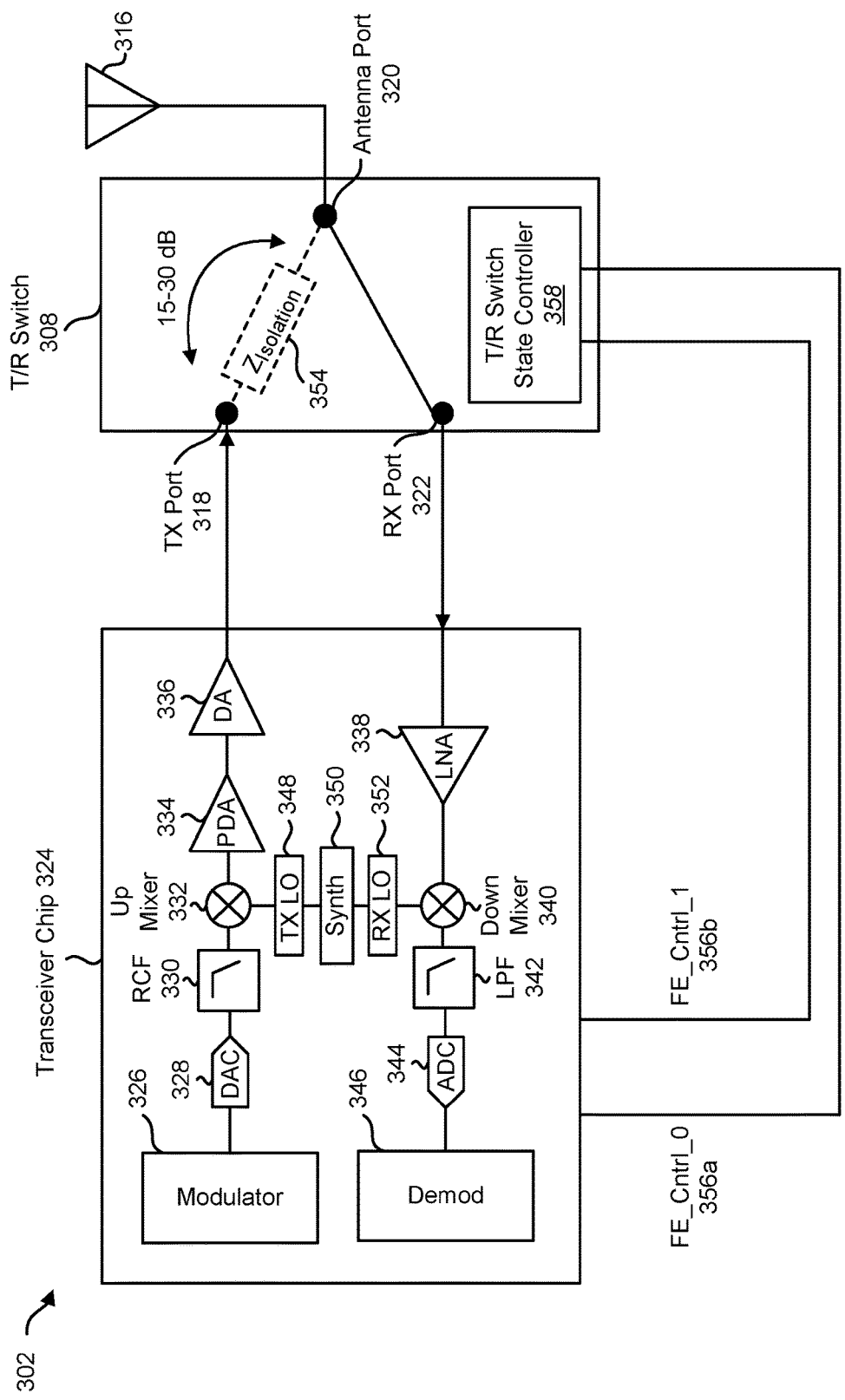
FIG. 3 is a block diagram illustrating another configuration of a wireless communication device for reducing transmit and receive power via a T/R switch.

FIG. 3 is a block diagram illustrating another configuration of a wireless communication device 302 for reducing transmit and receive power via a transmit/receive (T/R) switch 308. The wireless communication device 302 may include a transceiver chip 324 (e.g., integrated circuit) that includes a transmit chain and a receive chain.

In an implementation, the transmit chain may include a modulator 326, a digital-to-analog converter (DAC) 328, a reconstruction filter (RCF) 330, an up mixer 332, a pre driver/amplifier (PDA) 334 and driver/amplifier (DA) 336. The up mixer 332 may be coupled to a TX local oscillator (LO) 348. A synthesizer (synth) 350 may provide a frequency to the TX LO 348. The DA 336 may provide a TX signal to the TX port 318 of the T/R switch 308.

In an implementation, the receive chain may include a low-noise amplifier (LNA) 338, a down mixer 340, a low-pass filter (LPF) 342, an analog-to-digital converter (ADC) 344 and demodulator (demod) 346. The down mixer 340 may be coupled to an RX LO 352. The synthesizer (synth) 350 may provide a frequency to the RX LO 352. The LNA 338 may receive a receive signal from the RX port 322 of the T/R switch 308.

The wireless communication device 302 may also include a T/R switch 308. In this case, the T/R switch 308 is a single-pole double-throw (SP2T) switch. The T/R switch 308 includes a transmit (TX) port coupled to the DA 336 of the transmit chain, an RX port 322 coupled to the LNA 338 of the receive chain and an antenna port 320 coupled to an antenna 316. The T/R switch 308 may also include a T/R switch state controller 358.

Control signals 356 may switch the state (or configuration) of the T/R switch 308. For example a first control signal (FE_Cntrl_0) 356a and second control signal (FE_Cntrl_1) 356b may be sent from the transceiver chip 324 to the T/R switch state controller 358. The control signals 356 may cause the T/R switch 308 to switch from the TX port 318 to the RX port 322. For example, a first value of the control signals 356 may cause the T/R switch 308 to connect the TX port 318 to the antenna port 320 and disconnect the RX port 322 from the antenna port 320. A second value of the control signals 356 may cause the T/R switch 308 to connect the RX port 322 to the antenna port 320 and disconnect the TX port 318 from the antenna port 320.

It should be noted that while two possible states are shown in FIG. 3, the T/R switch 308 may be configured with additional ports. In this case, the control signals 356 may instruct the T/R switch 308 to establish a connection between the one or more additional ports and the TX port 318, the RX port 322 or the antenna port 320.

In this example, the T/R switch 308 is set to connect the RX port 322 to the antenna 316. This configuration results in an impedance ($Z_{isolation}$) 354 between the TX port 318 and the antenna 316. Typical values for the $Z_{isolation}$ 354 of an external T/R switch 308 are between 15-30 dB. This $Z_{isolation}$ 354 may also be referred to as a high insertion loss.

In FIG. 3, the transmit chain (e.g., transmitter 104) may operate in a high insertion loss mode 112. The T/R switch 308 may be used to disconnect (i.e., isolate) the transmit chain from the antenna port 320 when the transmit chain is actively transmitting in a high insertion loss mode 112. For example, the T/R switch 308 disconnects the transmit chain from the antenna port 320 by connecting the antenna port 320 to the receiver port 322. This may reduce power from the transmit chain to the antenna 116. In another implementation, the T/R switch 308 may create high insertion loss for the transmit chain by connecting the antenna port 320 to another loaded port of the T/R switch 308 (e.g., a port that is not associated with the TX port 318 of the active transmit chain).

Figure 4:
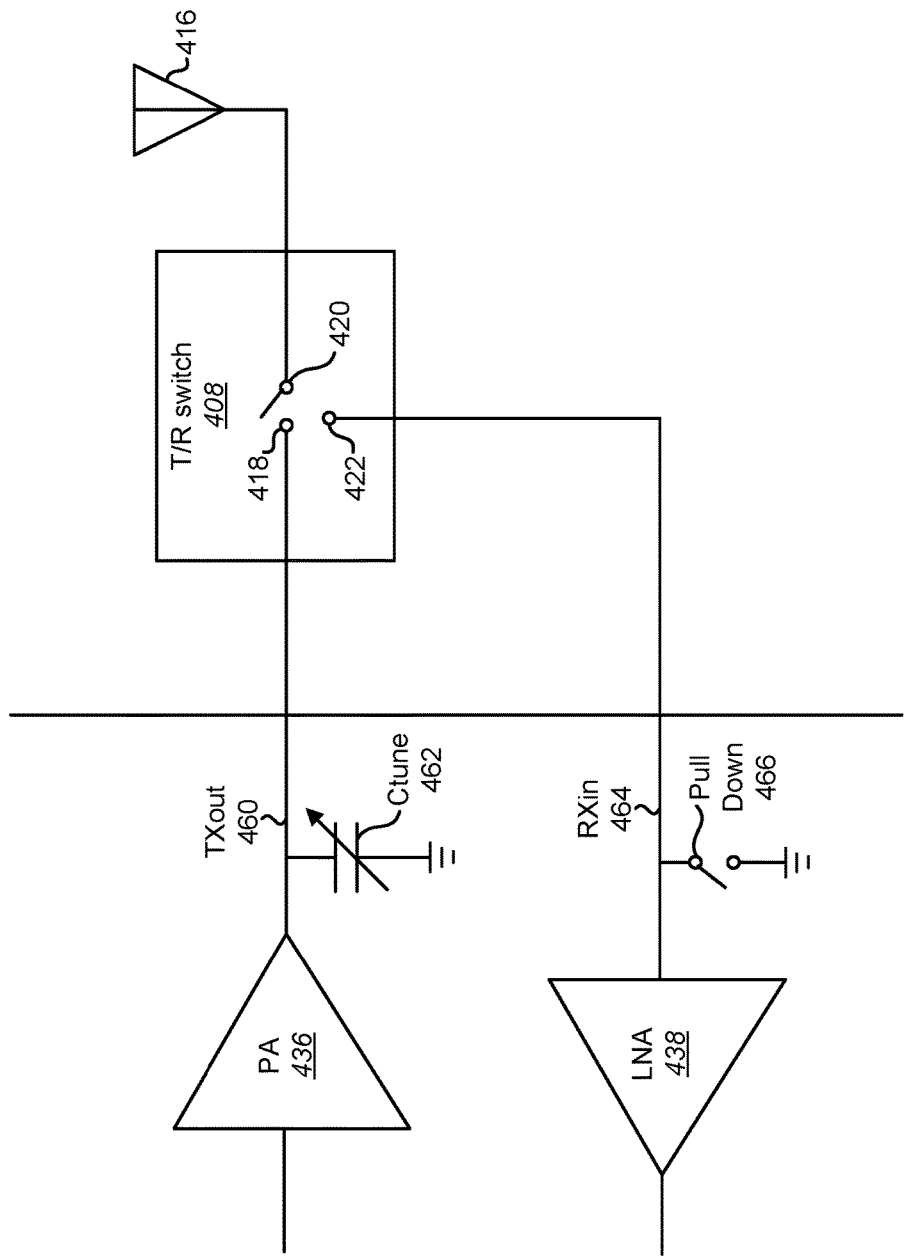
FIG. 4 is a block diagram illustrating one approach for generating a dummy load for use in high insertion loss mode.

FIG. 4 is a block diagram illustrating one approach for generating a dummy load for use in high insertion loss mode 112. In normal mode 114, the low-noise amplifier (LNA) 438 of the receiver 106 needs to be turned off while transmitting. A dummy load may be generated to present the power amplifier (PA) 436 of the transmitter 104 with a similar impedance in the two modes of operation (i.e., normal mode 114 and high insertion loss mode 112).

In a normal mode 114 for transmission, the PA 436 is on (i.e., active) and the T/R switch 408 connects the transmitter 104 to the antenna 416. In this case, the impedance between the TX port 418 and the antenna port 420 may be referred to as Z_PA_HIGHPOWER. It should be noted that this is normal operation of the T/R switch 408.

In high insertion loss mode 112, the PA 436 is on (i.e., active) but the T/R switch 108 connects the receiver port 422 (or other loaded port of the T/R switch 408) to the antenna port 420. In this case, the impedance between the TX port 418 and the antenna port 420 may be called Z_PA_LOW-POWER. It should be noted that the intended isolation is between the transmitter 104 and the antenna 416.

The LNA 438 of the receiver 106 may be turned off by using a pull-down switch 466 at the gate of the receiver 106. For example, the pull-down switch 466 may be coupled to the input receive signal (RX_in) 464. The pull-down switch 466 may be closed when the transmitter 104 is active, otherwise the pull-down switch 466 may be open.

The pull-down switch 466 may be sized such that the real components of the isolation are equal in both the normal mode 114 and the high insertion loss mode 112. In other words, Real(Z_PA_HIGHPOWER)=Real(Z_PA_LOW-POWER). Then, the imaginary parts of Z_PA_HIGH-POWER and Z_PA_LOWPOWER can be compensated by tuning the internal capacitance (Ctune) 462 at the PA 436 output differently depending upon the mode of operation. In an implementation, the imaginary parts of Z_PA_HIGH-POWER and Z_PA_LOWPOWER can be compensated by measuring the S-Parameters with a network analyzer while changing the Ctune 462 until the desired return loss is achieved.

This approach may protect the receiver 106 from damage when the transmitter 104 switches between normal mode 114 and high insertion loss mode 112. For example, this approach provides output powers on the TX output signal (TXout) 460 that do not damage the LNA 438 input of the receiver 106.

Figure 5:
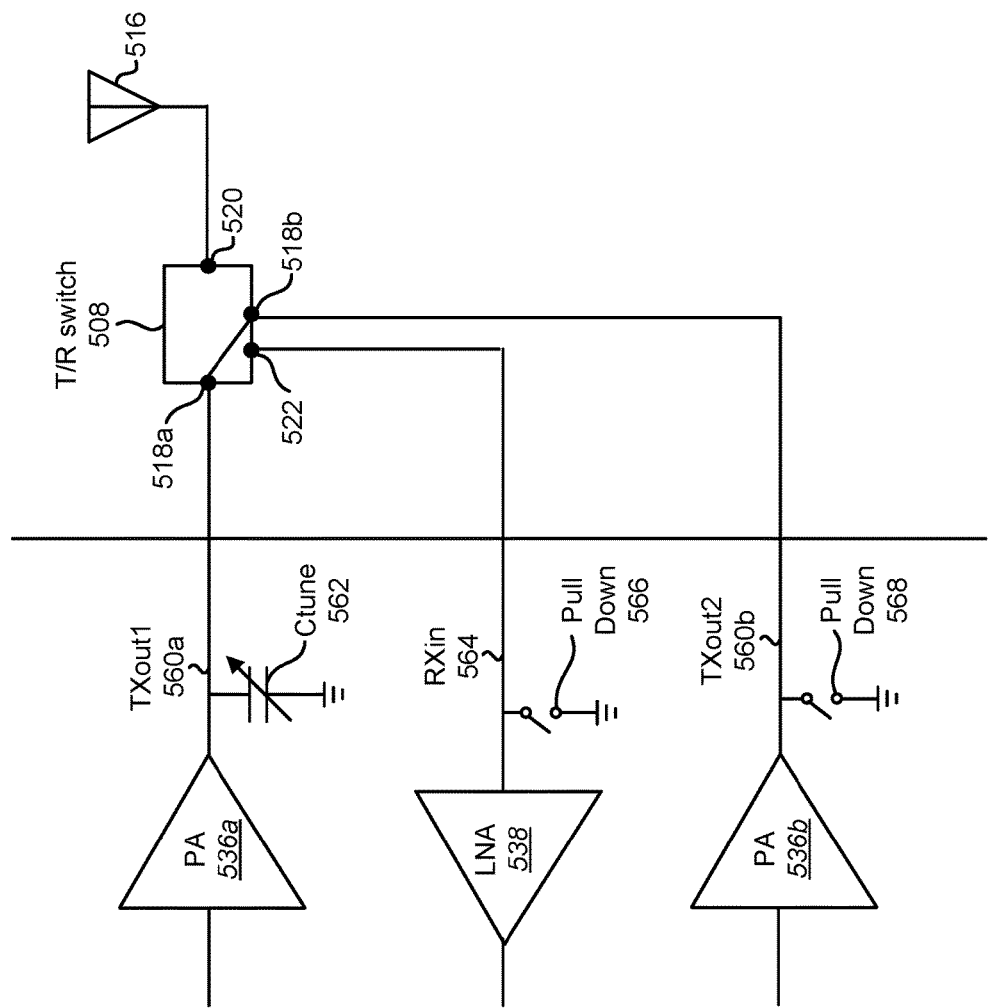
FIG. 5 is a block diagram illustrating another approach for generating a dummy load for use in high insertion loss mode.

FIG. 5 is a block diagram illustrating another approach for generating a dummy load for use in high insertion loss mode 112. In cases where the devices have multiple TX chains, even higher output power levels from the active transmitter 104 may be applied.

In an implementation, the T/R switch 508 may include a first TX port 518a, a second TX port 518b, an RX port 522 and an antenna port 520. The first TX port 518a may be coupled to a first transmitter output signal (TXout1) 560a of a first transmit chain (TX1) that includes a first PA 536a. The second TX port 518b may be coupled to a second transmitter output signal (TXout2) 560b of a second transmit chain (TX2) that includes a second PA 536b. The RX port 522 may be coupled to a receiver input signal (RXin) 564 of a receiver chain that includes an LNA 538.

In this approach, the first transmitter output signal (TXout1) 560a of the first transmit chain (TX1) may be coupled to a variable capacitor (Ctune) 562 and the first TX port 518a of the T/R switch 508. The receiver input signal (RXin) 564 may be coupled to a pull-down switch 566. The second transmitter output signal (TXout2) 560b may be coupled to a pull-down switch 568. Both pull-down switches 566, 568 may be closed when the first transmit chain (TX1) is active, otherwise the pull-down switches 566, 568 may be open.

To calibrate TX1, the T/R switch 508 can be placed at the TX2 output. In other words, the T/R switch 508 may connect TX1 to TX2 to isolate TX1 from the antenna 516. An advantage is that the PA 536b output (TXOUT2) of TX2 can sustain higher power levels compared to the LNA Input (RXin) 564.

Figure 6:
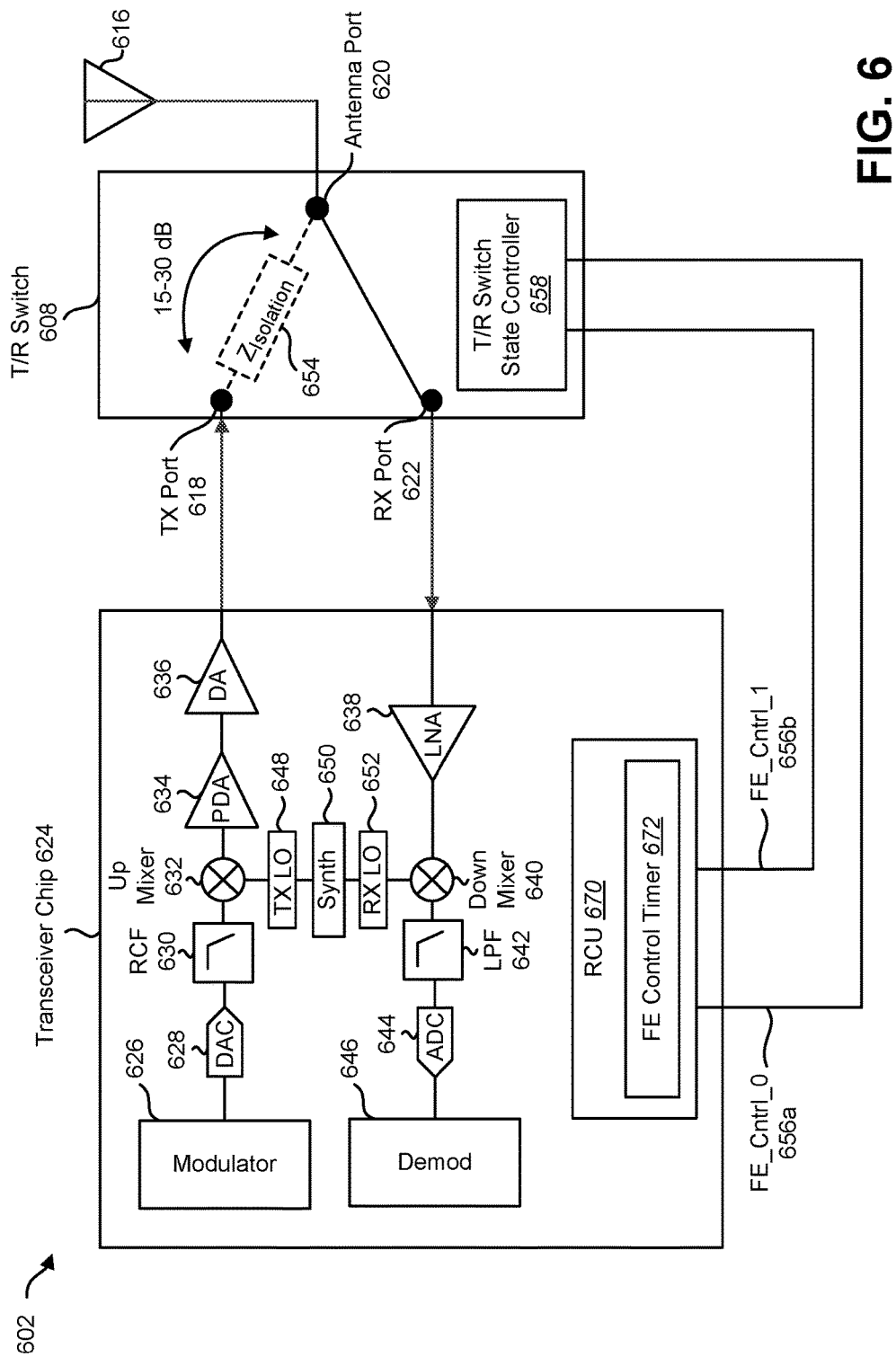
FIG. 6 is a block diagram illustrating yet another configuration of a wireless communication device for reducing transmit and receive power via a T/R switch.

FIG. 6 is a block diagram illustrating yet another configuration of a wireless communication device 602 for reducing transmit and receive power via a transmit/receive (T/R) switch 608. The wireless communication device 602 of FIG. 6 may be implemented in accordance with the wireless communication device 302 of FIG. 3. The wireless communication device 602 may include a transceiver chip 624 (e.g., integrated circuit) that includes a transmit chain and a receive chain.

In an implementation, the transmit chain may include a modulator 626, a digital-to-analog converter (DAC) 628, a reconstruction filter (RCF) 630, an up mixer 632, a pre driver/amplifier (PDA) 634 and driver/amplifier (DA) 636. The up mixer 632 may be coupled to a TX local oscillator (LO) 648. A synthesizer (synth) 650 may provide a frequency to the TX LO 648. The DA 636 may provide a TX output signal to the TX port 618 of the T/R switch 608.

In an implementation, the receive chain may include a low-noise amplifier (LNA) 638, a down mixer 640, a low-pass filter (LPF) 642, an analog-to-digital converter (ADC) 644 and demodulator (demod) 646. The down mixer 640 may be coupled to an RX LO 652. The synthesizer (synth) 650 may provide a frequency to the RX LO 652. The LNA 638 may receive an RX input signal from the RX port 622 of the T/R switch 608.

The wireless communication device 602 may also include a T/R switch 608. In this case, the T/R switch 608 is a single-pole double-throw (SP2T) switch. The T/R switch 608 includes a transmit (TX) port coupled to the DA 636 of the transmit chain, an RX port 622 coupled to the LNA 638 of the receive chain and an antenna port 620 coupled to an antenna 616. The T/R switch 608 may also include a T/R switch state controller 658.

In FIG. 6, the transmit chain (e.g., transmitter 104) may operate in a high insertion loss mode 112 as described in connection with FIG. 3. Furthermore, the wireless communication device 602 may include a radio control unit (RCU) 670. The RCU 670 may include a programmable front end (FE) control timer 672 that controls the T/R switch Rx and TX modes of operation. For example, the RCU 670 may set the T/R switch 608 to isolate the transmitter 104 from the antenna port 620 to reduce frequency splatter during TX ramp up or TX ramp down. Additionally, the RCU 670 may set the T/R switch 608 to isolate (i.e., disconnect) the transmitter 104 from the antenna port 620 to reduce local oscillator (LO) leakage during TX ramp up and/or ramp down. Therefore, the FE control timer 672 may precisely introduce the T/R switch isolation ($Z_{Isolation}$) only during the ramp up and ramp down states, the times at which the frequency splatter is occurring.

Control signals 656 from the RCU 670 may switch the state (or configuration) of the T/R switch 608. For example a first control signal (FE_Cntrl_0) 656a and second control signal (FE_Cntrl_1) 656b may be sent from the RCU 670 to the T/R switch state controller 658. The control signals 656 may cause the T/R switch 608 to switch from the TX port 618 to the RX port 622. For example, a first value of the control signals 656 may cause the T/R switch 608 to connect the TX port 618 to the antenna port 620 and disconnect the RX port 622 from the antenna port 620. A second value of the control signals 656 may cause the T/R switch 608 to connect the RX port 622 to the antenna port 620 and disconnect the TX port 618 from the antenna port 620.

The amount of time that the transmit chain operates in high insertion loss mode 112 may be based on the FE control timer 672. When the FE control timer 672 expires, the RCU 670 may set the T/R switch 608 to connect the transmitter port 618 to the antenna port 620.

Figure 7:
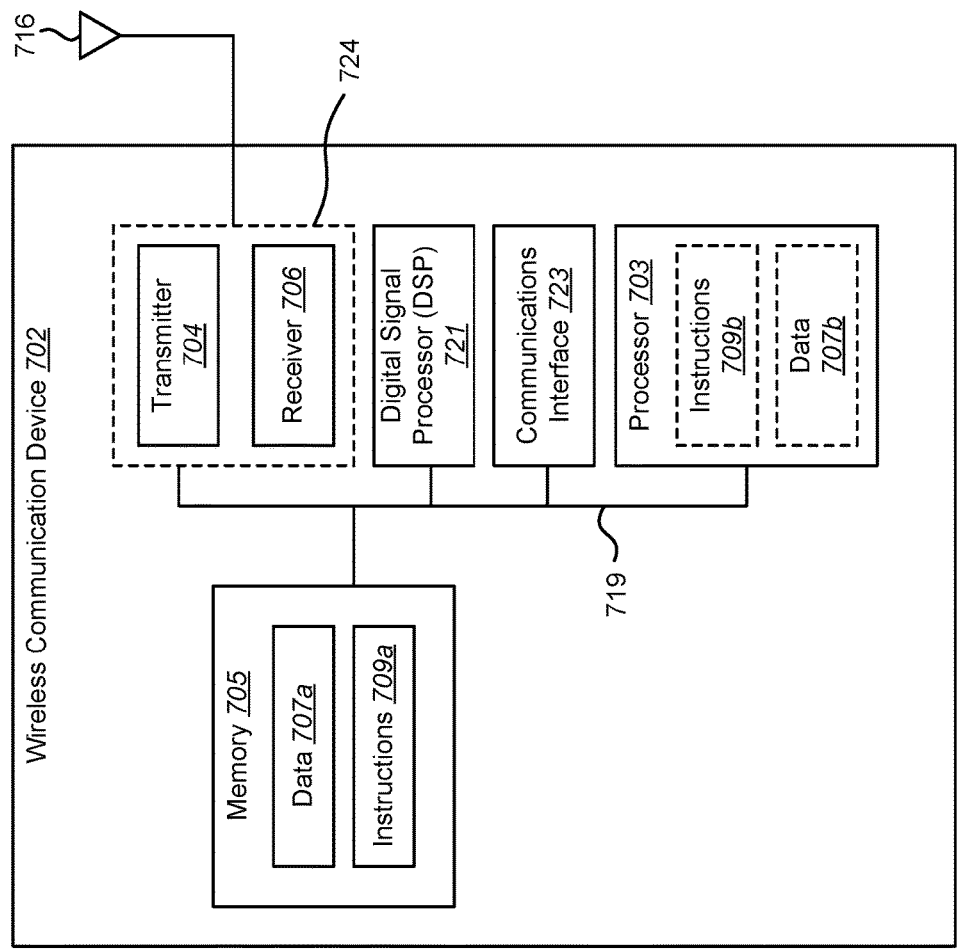
FIG. 7 illustrates certain components that may be included within a wireless communication device.

FIG. 7 illustrates certain components that may be included within a wireless communication device 702. The wireless communication device 702 may be a wireless device, an access terminal, a mobile station, a user equipment (UE), a laptop computer, a desktop computer, etc. For example, the wireless communication device 702 of FIG. 7 may be implemented in accordance with the wireless communication device of FIG. 1.

The wireless communication device 702 includes a processor 703. The processor 703 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 703 may be referred to as a central processing unit (CPU). Although just a single processor 703 is shown in the wireless communication device 702 of FIG. 7, in an alternative configuration, a combination of processors (e.g., an ARM and DSP) could be used.

The wireless communication device 702 also includes memory 705 in electronic communication with the processor 703 (i.e., the processor can read information from and/or write information to the memory). The memory 705 may be any electronic component capable of storing electronic information. The memory 705 may be configured as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 707a and instructions 709a may be stored in the memory 705. The instructions 709a may include one or more programs, routines, sub-routines, functions, procedures, code, etc. The instructions 709a may include a single computer-readable statement or many computer-readable statements. The instructions 709a may be executable by the processor 703 to implement the methods disclosed herein. Executing the instructions 709a may involve the use of the data 707a that is stored in the memory 705. When the processor 703 executes the instructions 709a, various portions of the instructions 709b may be loaded onto the processor 703, and various pieces of data 707b may be loaded onto the processor 703.

The wireless communication device 702 may also include a transmitter 704 and a receiver 706 to allow transmission and reception of signals to and from the wireless communication device 702 via an antenna 716. The transmitter 704 and receiver 706 may be collectively referred to as a transceiver 724. The wireless communication device 702 may also include (not shown) multiple transmitters, multiple antennas, multiple receivers and/or multiple transceivers.

The wireless communication device 702 may include a digital signal processor (DSP) 721. The wireless communication device 702 may also include a communications interface 723. The communications interface 723 may allow a user to interact with the wireless communication device 702.

The various components of the wireless communication device 702 may be coupled together by one or more buses, which may include a power bus, a control signal bus, a status signal bus, a data bus, etc. For the sake of clarity, the various buses are illustrated in FIG. 7 as a bus system 719.

Figure 8:
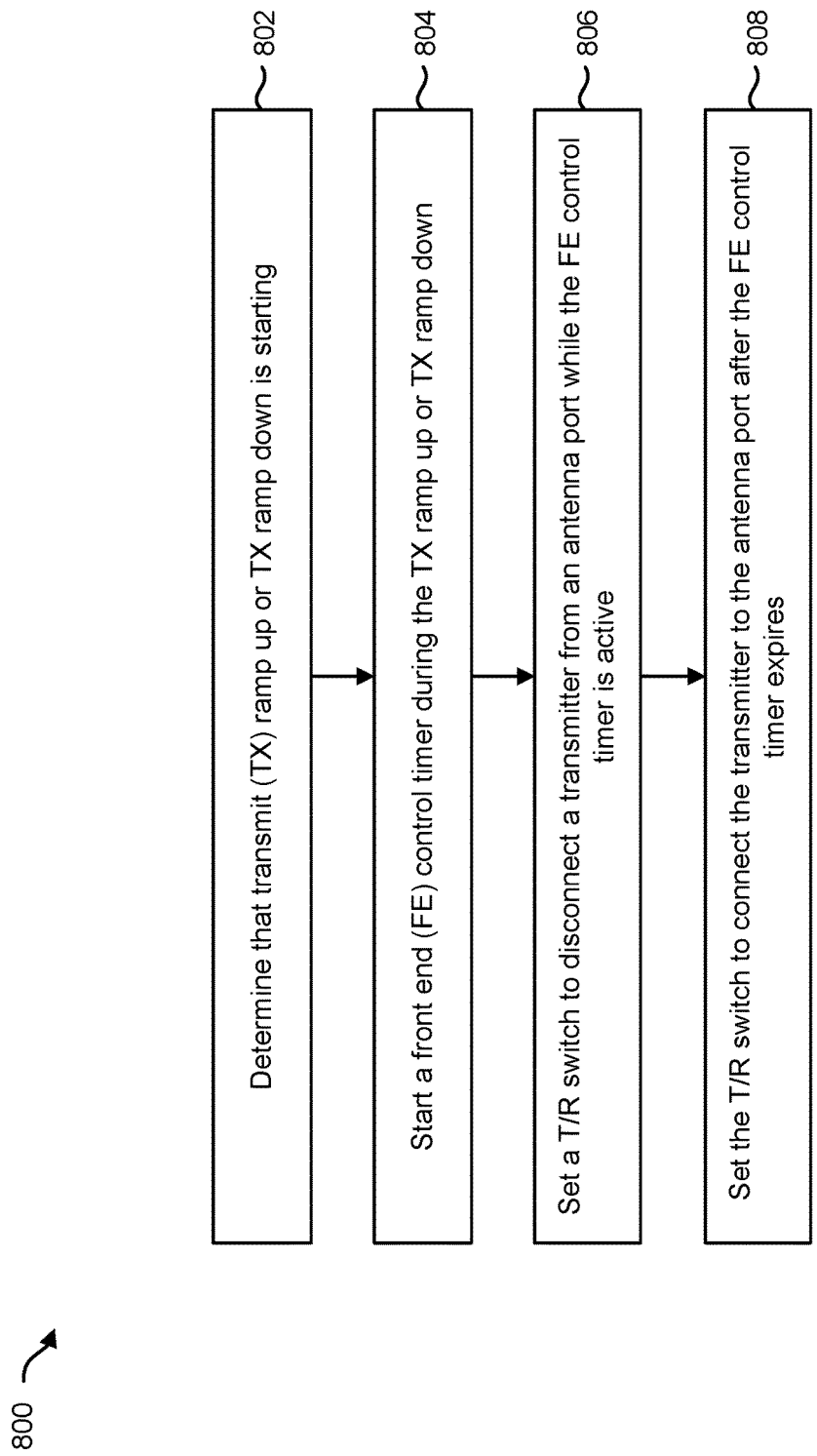
FIG. 8 is a flow diagram illustrating a method for reducing undesired emissions from an antenna during transmit (TX) ramp up or TX ramp down.

FIG. 8 is a flow diagram illustrating a method 800 for reducing undesired emissions from an antenna during TX ramp up or TX ramp down. The method 800 may be performed by a wireless communication device 102. In one configuration, the wireless communication device 102 may be configured with a transmitter 104, a receiver 106 and a T/R switch 108 as described in connection with FIG. 1.

The wireless communication device 102 may determine 802 that TX ramp up or TX ramp down is starting. For a TX ramp up, the wireless communication device 102 may determine that a pre driver/amplifier (PDA) 334 and a driver/amplifier (DA) 336 are about to become active. In another aspect, the wireless communication device 102 may determine that a PLL is about to tune.

For a TX ramp down, the wireless communication device 102 may determine that the PDA 334 and DA 336 are about to become inactive. During TX ramp up or ramp down, the sudden current rush, transients, and other magnetically coupled disturbances can pull the VCO off frequency.

The wireless communication device 102 may start 804 an FE control timer 672 during the TX ramp up or TX ramp down. When the FE control timer 672 is active, the wireless communication device 102 may enter a high insertion loss mode 112. For TX ramp up or ramp down, the FE control timer 672 may be based on the time it takes for the PDA 334 and DA 336 to reach stable TX output power. In another aspect, the FE control timer 672 may be based on the PLL tune/settling time during TX ramp up.

The wireless communication device 102 may set 806 the T/R switch 108 to disconnect the transmitter 104 from the antenna port 120 while the FE control timer 672 is active. For example, the T/R switch 108 may connect the antenna port 120 to the RX port 122 during TX ramp up or TX ramp down. The $Z_{Isolation}$ 654 will reduce undesired emissions from the antenna 116 during TX ramp up or TX ramp down by a significant amount.

The wireless communication device 102 may set 808 the T/R switch 108 to connect the transmitter 104 to the antenna port 120 after the FE control timer 672 expires. After the TX ramp up or TX ramp down, the $Z_{Isolation}$ 654 may be removed by switching the T/R switch 108 to the TX port 118 to not impact TX output power. In other words, the wireless communication device 102 may set the T/R switch 108 to connect the transmitter port 118 to the antenna port 120 after the TX ramp up or TX ramp down.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

As used herein, the term "and/or" should be interpreted to mean one or more items. For example, the phrase "A, B and/or C" should be interpreted to mean any of: only A, only B, only C; A and B (but not C); B and C (but not A); A and C (but not B); or all of A, B, and C.

As used herein, the phrase "at least one of" should be interpreted to mean one or more items. For example, the phrase "at least one of A, B and C" or the phrase "at least one of A, B or C" should be interpreted to mean any of: only A, only B, only C; A and B (but not C); B and C (but not A); A and C (but not B); or all of A, B, and C.

As used herein, the phrase "one or more of" should be interpreted to mean one or more items. For example, the phrase "one or more of A, B and C" or the phrase "one or more of A, B or C" should be interpreted to mean any of: only A, only B, only C; A and B (but not C); B and C (but not A); A and C (but not B); or all of A, B, and C.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless communication device, comprising:
   a transmit/receive (T/R) switch that is configured with an antenna port coupled to an antenna, a transmitter port coupled to a transmitter and a receiver port coupled to a receiver, wherein the T/R switch selectively connects the transmitter port to the antenna port or the receiver port to the antenna port; and
   a T/R switch controller that sets the T/R switch to disconnect the transmitter from the antenna when the transmitter is actively transmitting in a high insertion loss mode to reduce power from the transmitter to the antenna; and
   wherein the wireless communication device determines a transmit (TX) to receiver (RX) loopback signal to measure T/R switch attenuation during the high insertion loss mode.

2. The wireless communication device of claim 1, wherein the T/R switch disconnects the transmitter from the antenna by connecting the antenna port to the receiver port.

3. The wireless communication device of claim 1, wherein the T/R switch disconnects the transmitter from the antenna by connecting the transmitter port to a second transmitter port.

4. The wireless communication device of claim 1, wherein the T/R switch controller is further configured to set the T/R switch to disconnect the receiver from the antenna port when the receiver is actively receiving in high insertion loss mode to reduce power received at the receiver from the antenna.

5. A wireless communication device, comprising:
a transmit/receive (T/R) switch that is configured with an antenna port coupled to an antenna, a transmitter port coupled to a transmitter and a receiver port coupled to a receiver, wherein the T/R switch selectively connects the transmitter port to the antenna port or the receiver port to the antenna port;
a T/R switch controller that sets the T/R switch to disconnect the transmitter from the antenna when the transmitter is actively transmitting in a high insertion loss mode to reduce power from the transmitter to the antenna; and
wherein the T/R switch controller is further configured to set the T/R switch to disconnect the transmitter from the antenna to reduce frequency splatter during TX ramp up or TX ramp down.

6. The wireless communication device of claim 5, wherein the T/R switch controller is further configured to set the T/R switch to connect the transmitter port to the antenna port after the TX ramp up or before TX ramp down.

7. A wireless communication device, comprising:
a transmit/receive (T/R) switch that is configured with an antenna port coupled to an antenna, a transmitter port coupled to a transmitter and a receiver port coupled to a receiver, wherein the T/R switch selectively connects the transmitter port to the antenna port or the receiver port to the antenna port;
a T/R switch controller that sets the T/R switch to disconnect the transmitter from the antenna when the transmitter is actively transmitting in a high insertion loss mode to reduce power from the transmitter to the antenna;
setting a phase-locked loop (PLL) in the transmitter to a certain frequency;
setting the T/R switch to the receiver port to avoid sending out un-wanted signals;
activating a power amplifier of the transmitter;
detecting a frequency shift at the receiver, the frequency shift being a function of local oscillator (LO) pulling; and
compensating a voltage-controlled oscillator (VCO) based on the frequency shift.

8. A wireless communication device, comprising:
a transmit/receive (T/R) switch that is configured with an antenna port coupled to an antenna, a transmitter port coupled to a transmitter and a receiver port coupled to a receiver, wherein the T/R switch selectively connects the transmitter port to the antenna port or the receiver port to the antenna port;
a T/R switch controller that sets the T/R switch to disconnect the transmitter from the antenna when the transmitter is actively transmitting in a high insertion loss mode to reduce power from the transmitter to the antenna; and
wherein the T/R switch controller is further configured to set the T/R switch to disconnect the transmitter from the antenna to reduce local oscillator (LO) leakage during TX ramp up.

9. The wireless communication device of claim 8, wherein the T/R switch disconnects the transmitter from the antenna during PLL tune and settling times.

10. The wireless communication device of claim 8, wherein the T/R switch controller is further configured to set the T/R switch to connect the transmitter port to the antenna port after the TX ramp up or before TX ramp down.

11. A method, comprising:
determining to operate in a high insertion loss mode to reduce power from a transmitter to an antenna;
setting a transmit/receive (T/R) switch to disconnect the transmitter from the antenna when the transmitter is actively transmitting in the high insertion loss mode, wherein the T/R switch is configured with an antenna port coupled to the antenna, a transmitter port coupled to the transmitter and a receiver port coupled to a receiver, and wherein the T/R switch selectively connects the transmitter port to the antenna port or the receiver port to the antenna port; and
determining a transmit (TX) to receiver (RX) loopback signal to measure T/R switch attenuation during the high insertion loss mode.

12. The method of claim 11, wherein the T/R switch disconnects the transmitter from the antenna by connecting the antenna port to the receiver port.

13. The method of claim 11, wherein the T/R switch disconnects the transmitter from the antenna by connecting the transmitter port to a second transmitter port.

14. The method of claim 11, further comprising setting the T/R switch to disconnect the receiver from the antenna port when the receiver is actively receiving in high insertion loss mode to reduce power received at the receiver from the antenna.

15. A method, comprising:
determining to operate in a high insertion loss mode to reduce power from a transmitter to an antenna;
setting a transmit/receive (T/R) switch to disconnect the transmitter from the antenna when the transmitter is actively transmitting in the high insertion loss mode, wherein the T/R switch is configured with an antenna port coupled to the antenna, a transmitter port coupled to the transmitter and a receiver port coupled to a receiver, and wherein the T/R switch selectively connects the transmitter port to the antenna port or the receiver port to the antenna port; and
setting the T/R switch to disconnect the transmitter from the antenna to reduce frequency splatter during TX ramp up or TX ramp down.

16. A method, comprising:
determining to operate in a high insertion loss mode to reduce power from a transmitter to an antenna;
setting a transmit/receive (T/R) switch to disconnect the transmitter from the antenna when the transmitter is actively transmitting in the high insertion loss mode, wherein the T/R switch is configured with an antenna port coupled to the antenna, a transmitter port coupled to the transmitter and a receiver port coupled to a receiver, and wherein the T/R switch selectively connects the transmitter port to the antenna port or the receiver port to the antenna port;
setting a phase-locked loop (PLL) in the transmitter to a certain frequency;
setting the T/R switch to the receiver port to avoid sending out un-wanted signals;
activating a power amplifier of the transmitter;
detecting a frequency shift at the receiver, the frequency shift being a function of local oscillator (LO) pulling; and
compensating a voltage-controlled oscillator (VCO) based on the frequency shift.

17. A method, comprising:
determining to operate in a high insertion loss mode to reduce power from a transmitter to an antenna;
setting a transmit/receive (T/R) switch to disconnect the transmitter from the antenna when the transmitter is actively transmitting in the high insertion loss mode, wherein the T/R switch is configured with an antenna port coupled to the antenna, a transmitter port coupled to the transmitter and a receiver port coupled to a receiver, and wherein the T/R switch selectively connects the transmitter port to the antenna port or the receiver port to the antenna port; and setting the T/R switch to disconnect the transmitter from the antenna to reduce local oscillator (LO) leakage during TX ramp up.

18. A non-transitory tangible computer readable medium for concurrent transmission, the computer readable medium storing computer executable code, comprising:

code for causing a wireless communication device to determine to operate in a high insertion loss mode to reduce power from a transmitter to an antenna;

code for causing the wireless communication device to set a transmit/receive (T/R) switch to disconnect the transmitter from the antenna when the transmitter is actively transmitting in the high insertion loss mode, wherein the T/R switch is configured with an antenna port coupled to the antenna, a transmitter port coupled to the transmitter and a receiver port coupled to a receiver, and wherein the T/R switch selectively connects the transmitter port to the antenna port or the receiver port to the antenna port; and code for causing the wireless communication device to determine a transmit (TX) to receiver (RX) loopback signal to measure T/R switch attenuation during the high insertion loss mode.

19. The computer readable medium of claim 18, wherein the T/R switch disconnects the transmitter from the antenna by connecting the antenna port to the receiver port.

20. The computer readable medium of claim 18, further comprising code for causing the wireless communication device to set the T/R switch to disconnect the receiver from the antenna port when the receiver is actively receiving in a high insertion loss mode to reduce power received at the receiver from the antenna.

21. A non-transitory tangible computer readable medium for concurrent transmission, the computer readable medium storing computer executable code, comprising:

code for causing a wireless communication device to determine to operate in a high insertion loss mode to reduce power from a transmitter to an antenna;

code for causing the wireless communication device to set a transmit/receive (T/R) switch to disconnect the transmitter from the antenna when the transmitter is actively transmitting in the high insertion loss mode, wherein the T/R switch is configured with an antenna port coupled to the antenna, a transmitter port coupled to the transmitter and a receiver port coupled to a receiver, and wherein the T/R switch selectively connects the transmitter port to the antenna port or the receiver port to the antenna port; and code for causing the wireless communication device to set the T/R switch to disconnect the transmitter from the antenna to reduce frequency splatter during TX ramp up or TX ramp down.

22. A non-transitory tangible computer readable medium for concurrent transmission, the computer readable medium storing computer executable code, comprising:

code for causing a wireless communication device to determine to operate in a high insertion loss mode to reduce power from a transmitter to an antenna;

code for causing the wireless communication device to set a transmit/receive (T/R) switch to disconnect the transmitter from the antenna when the transmitter is actively transmitting in the high insertion loss mode, wherein the T/R switch is configured with an antenna port coupled to the antenna, a transmitter port coupled to the transmitter and a receiver port coupled to a receiver, and wherein the T/R switch selectively connects the transmitter port to the antenna port or the receiver port to the antenna port; and code for causing the wireless communication device to set the T/R switch to disconnect the transmitter from the antenna to reduce local oscillator (LO) leakage during TX ramp up.

23. An apparatus, comprising:

means for determining to operate in a high insertion loss mode to reduce power from a transmitter to an antenna;

means for setting a transmit/receive (T/R) switch to disconnect the transmitter from the antenna when the transmitter is actively transmitting in the high insertion loss mode, wherein the T/R switch is configured with an antenna port coupled to the antenna, a transmitter port coupled to the transmitter and a receiver port coupled to a receiver, and wherein the T/R switch selectively connects the transmitter port to the antenna port or the receiver port to the antenna port; and means for determining a transmit (TX) to receiver (RX) loopback signal to measure T/R switch attenuation during the high insertion loss mode.

24. The apparatus of claim 23, wherein the T/R switch disconnects the transmitter from the antenna by connecting the antenna port to the receiver port.

25. An apparatus, comprising:

means for determining to operate in a high insertion loss mode to reduce power from a transmitter to an antenna;

means for setting a transmit/receive (T/R) switch to disconnect the transmitter from the antenna when the transmitter is actively transmitting in the high insertion loss mode, wherein the T/R switch is configured with an antenna port coupled to the antenna, a transmitter port coupled to the transmitter and a receiver port coupled to a receiver, and wherein the T/R switch selectively connects the transmitter port to the antenna port or the receiver port to the antenna port; and means for setting the T/R switch to disconnect the transmitter from the antenna to reduce frequency splatter during TX ramp up or TX ramp down.

26. An apparatus, comprising:

means for determining to operate in a high insertion loss mode to reduce power from a transmitter to an antenna;

means for setting a transmit/receive (T/R) switch to disconnect the transmitter from the antenna when the transmitter is actively transmitting in the high insertion loss mode, wherein the T/R switch is configured with an antenna port coupled to the antenna, a transmitter port coupled to the transmitter and a receiver port coupled to a receiver, and wherein the T/R switch selectively connects the transmitter port to the antenna port or the receiver port to the antenna port; and means for setting the T/R switch to disconnect the transmitter from the antenna to reduce local oscillator (LO) leakage during TX ramp up.

* * * * *